(12) United States Patent
Egan et al.

(10) Patent No.: US 7,275,182 B2
(45) Date of Patent: Sep. 25, 2007

(54) METHOD AND APPARATUS FOR CORRELATING UPS CAPACITY TO SYSTEM POWER REQUIREMENTS

(75) Inventors: Patrick K. Egan, Rochester, MN (US); Todd J. Rosedahl, Zumbrota, MN (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 10/808,738

(22) Filed: Mar. 25, 2004

(65) Prior Publication Data

US 2005/0229037 A1 Oct. 13, 2005

(51) Int. Cl.
*G06F 11/00* (2006.01)
(52) U.S. Cl. .......................................... 714/22; 714/24
(58) Field of Classification Search .................. 714/22, 714/24
See application file for complete search history.

(56) References Cited

U.S. PATENT DOCUMENTS

| | | | | |
|---|---|---|---|---|
| 5,283,905 A | * | 2/1994 | Saadeh et al. ............... | 713/324 |
| 5,317,752 A | * | 5/1994 | Jewett et al. .................. | 714/14 |
| 5,781,448 A | * | 7/1998 | Nakamura et al. ........... | 700/293 |
| 6,389,546 B1 | * | 5/2002 | Kano et al. .................. | 713/340 |
| 6,757,835 B2 | * | 6/2004 | Kano et al. .................. | 713/340 |
| 6,832,324 B2 | * | 12/2004 | Mullins et al. ............. | 713/300 |
| 6,941,479 B1 | * | 9/2005 | Sugiura ....................... | 713/300 |
| 6,996,733 B2 | * | 2/2006 | Hershenson et al. ........ | 713/340 |
| 7,007,185 B2 | * | 2/2006 | Kano et al. .................. | 713/340 |

OTHER PUBLICATIONS

U.S. Appl. No. 10/687,438, "Method and Apparatus for Correlating System Resources to a Particular Line Cord", filed Oct. 16, 2003 (ROC920030181US1).

* cited by examiner

*Primary Examiner*—Scott Baderman
*Assistant Examiner*—Tim Bonura
(74) *Attorney, Agent, or Firm*—Patterson & Sheridan LLP

(57) ABSTRACT

Methods and apparatuses that automatically determine the capabilities of UPS devices. Systems automatically determine whether a UPS device is capable of protecting system resources by comparing the UPS capabilities against system requirements. Such systems can use that determination to approximate how long a UPS device can reliably supply power. Systems having multiple UPS devices can be implemented such that the connections of the UPS devices to system resources are automatically determined, the load on each UPS device can be found, the capabilities of the UPS devices can be obtained, a comparison between UPS load and UPS capabilities can made, and a warning of problems can be sent. Using UPS capability and load information a system can provide for a controlled shutdown of system resources.

13 Claims, 6 Drawing Sheets

| SUB-SYSTEM REQUIREMENTS | SUB-SYSTEM | POWER SUPPLY | UPS | AC LINE | UPS CAPACITY |
|---|---|---|---|---|---|
| 350 WATTS / 8 hrs. | 1 | 1 | 1 | 1 | 1175 WATTS / 8 hrs. |
| 350 WATTS / 8 hrs. | 1 | 2 | 2 | 2 | 1175 WATTS / 8 hrs. |
| 450 WATTS / 10 hrs. | 2 | 1 | 3 | 1 | 720 WATTS / 10 hrs. |
| 450 WATTS / 8 hrs. | 2 | 2 | 4 | 2 | 1500 WATTS / 24 hrs. |
| 400 WATTS / 8 hrs. | 3 | 1 | 1 | 1 | 1175 WATTS / 8 hrs. |
| 400 WATTS / 8 hrs. | 3 | 2 | 3 | 1 | 720 WATTS / 8 hrs. |

METHOD AND APPARATUS FOR CORRELATING UPS CAPACITY TO SYSTEM POWER REQUIREMENTS

CROSS-REFERENCE TO RELATED APPLICATIONS

This application is related to co-pending U.S. patent application Ser. No. 10/687,438, which was filed on Oct. 16, 2003 and is entitled "Method and Apparatus for Correlating System Resources to a Particular Line Cord," hereby incorporated by reference in its entirety.

BACKGROUND OF THE INVENTION

1. Field of the Invention

The present invention relates to improving the reliability of emergency power from uninterruptible power supplies.

2. Description of the Related Art

High reliability is often required in mission critical applications such as those that occur in medical, financial, communication, and military systems. Such systems can become very large and complex, involving numerous sub-systems that are integrated together by complex interconnections. For example, computer systems that process financial data can involve racks of hardware and can include hundreds of sub-systems, each with its own processors and power supplies. Another example is an Internet communication system that is comprised of numerous distributed servers. Such systems usually include a service processor that controls and integrates the individual sub-systems together under the direction of operating software.

Reliability can be so important that some systems have sub-systems with redundant power supplies that are connected to different power lines that are fed by different circuit-breakers. Other applications, e.g., communication servers, distribute user demands over distributed networks that are powered by different power lines that pass through different circuit breakers. Some applications are so critical that the different circuit-breakers are themselves powered by different power companies. However, no matter how reliable any power source is, it can fail. If dual-lines are fed from different circuit breakers powered by the same power company, the power company can fail. If different power companies are used, an electrical grid malfunction can shut-down both power companies.

While input power cannot be guaranteed, it is possible to provide protection by incorporating uninterruptible power supplies (UPS) devices into the system. A UPS device provides backup power in the event of an electrical outage or other power line disturbance. A UPS device usually includes a battery that powers an inverter that supplies operating power to the protected system or sub-system. The UPS device can either power the system or sub-system only when a failure occurs or it can power the system or sub-system continuously with the input AC power acting as a re-charger for the batteries.

UPS devices can provide sufficient power to operate a system for short periods of time, which can enable a controlled system shut-down to prevent, reduce, or mitigate problems. To improve reliability and/or to assist controlled shut-down it can be very useful to know what system resource is being powered by a particular UPS device and just how long power will be available. Then, if a UPS device signals that a power failure has or may occur the service processor can perform a controlled shut-down of impacted resources in time to protect data. Unfortunately, determining what system resource is connected to a particular UPS device and how long that device can reliably supply power becomes increasingly difficult as the number of UPS devices and system resources increase and as the protected system become more and more distributed. Complicating the problem is the desirability of determining which system resource is ultimately connected to a particular AC power line in a dual-line system.

Some dual-power line systems use only one UPS device that is fed from one AC power line. In such cases the other AC power line is directly connected to the other power line. In other dual-power line systems, each AC power line connects to a different UPS device. Either way, to maintain reliable operation it is important to ensure that each of the redundant power supplies is powered by a different AC power source. Otherwise, the purpose of having dual-power lines is defeated. It is also important that the UPS devices have sufficient capability to perform their intended tasks for the required period of time. That time period may be only long enough to protect data and to provide for an orderly system shut-down or it may extend until power can be restored or other measures are taken to keep the protected system operating. In a distributed system many different sub-systems are often connected to the same UPS device. If that UPS fails or if the UPS device does not have sufficient capability, those sub-systems can be brought down.

In the prior art a system designer would use manufacturer or test data to qualify particular UPS systems for particular applications. Installation personnel would then seek to ensure that the UPS devices are correctly installed. However, as systems become larger and as multiple UPS devices become more common it becomes increasingly difficult to ensure that a particular UPS device is suitable for its task. Complicating that problem is knowing what system or subsystem is actually being protected by a particular UPS device. Wiring errors or changes to a system over time can make it difficult to determine what is actually being protected. Determining whether a UPS device is suitable for its task is very difficult a as system expands over time, such as by adding new sub-systems, or changes over time, such as replacing an existing sub-system with a newer one. Dual line Cord Configurations add an additional layer of complexity due to the power supplies will draw half their max load during normal operation.

Therefore, techniques of identifying which system resource is connected to which UPS would be useful. Also useful would be a technique of automatically determining if a given UPS device is suitable for its task. Also useful would be a technique of enabling a system to automatically approximate how long a given UPS device can reliably supply power. Also beneficial would be a method of ensuring that sufficient notice is given before a particular UPS device fails to provide for a controlled system shut-down.

SUMMARY OF THE INVENTION

The principles of the present invention provide for methods and apparatuses that automatically determine the capability of UPS devices. Those principles further provide for an automatic determination if a UPS device is suitable for a particular application and can provide an automatic determination of how long a UPS device can reliably supply power. The principles of the present invention further provide for methods and apparatuses that determine which system resources are connected to which UPS device, and possibly which UPS device is connected to which AC power line. Such determinations can be used to increase the reliability of UPS protected systems by ensuring that redundant power supplies are operatively connected to different UPS devices and to different AC power lines and by ensuring that a UPS device is suitable for its intended application.

In one embodiment of the present invention, the configuration of a system having a UPS device is automatically determined, connection errors are found, the capability of the UPS device to perform its intended task is assessed, and, if problems exist, a warning is issued. The system could also determine which system resource is connected to which UPS device and can approximate how long a given UPS device can reliably supply power. Then, when a UPS device signals that a power failure has or may occur, the protected system can reference the configuration to determine when and how to perform a controlled shutdown of system resources to mitigate damage.

In one embodiment, a UPS device sends identifying information, such as an IP address or serial number, on an input AC power line or on a port connection (including the internet) to the protected system. The identifying information is subsequently detected by the sub-system or service processor, which then checks to ensure that redundant power supplies are not connected to the same UPS and/or to enable a controlled shutdown of system resources. The sent information also describes the power capacities of the UPS devices, which enables the protected system to determine whether a particular UPS device is suitable for its task, to signal a warning if the UPS device is not suitable, and to approximate how long each UPS device can reliably supply power. This enables a protected system to perform a controlled shut-down to mitigate damage.

In yet another embodiment, a UPS device provides data to a system that informs that system about the capability of the UPS devices, such as its output power capacity. That data can be provided upon power up, continuously, when requested by a system, or at some other time. The system can then determine the suitability of the UPS device for a particular application.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 illustrates a data table useful for describing the principles of the present invention;

To facilitate understanding, identical reference numerals have been used, wherever possible, to designate identical elements that are common to the figures.

DETAILED DESCRIPTION OF THE PREFERRED EMBODIMENT

The principles of the present invention provide for methods and apparatuses that improve system reliability providing for methods and apparatuses that enable automatic determination of the capability of UPS devices to perform their tasks, for example to supply output power in the amount and for the duration required. In systems that use redundant power supplies, the UPS-sub-system interconnections can be automatically checked to ensure that each redundant sub-system power supply is operatively connected to a different UPS, and possibly to a different AC power line. Once the sub-system-UPS connections are identified the system knows which UPS is connected to which sub-system. Then, the system can automatically compare system requirements with the capability of the UPS devices. Additionally, the system can check the capability of the UPS devices to determine how long sub-systems can reliably operate in the event of a power failure, and can provide for a controlled shutdown of system resources in the event of a UPS failure.

Figure 1A:
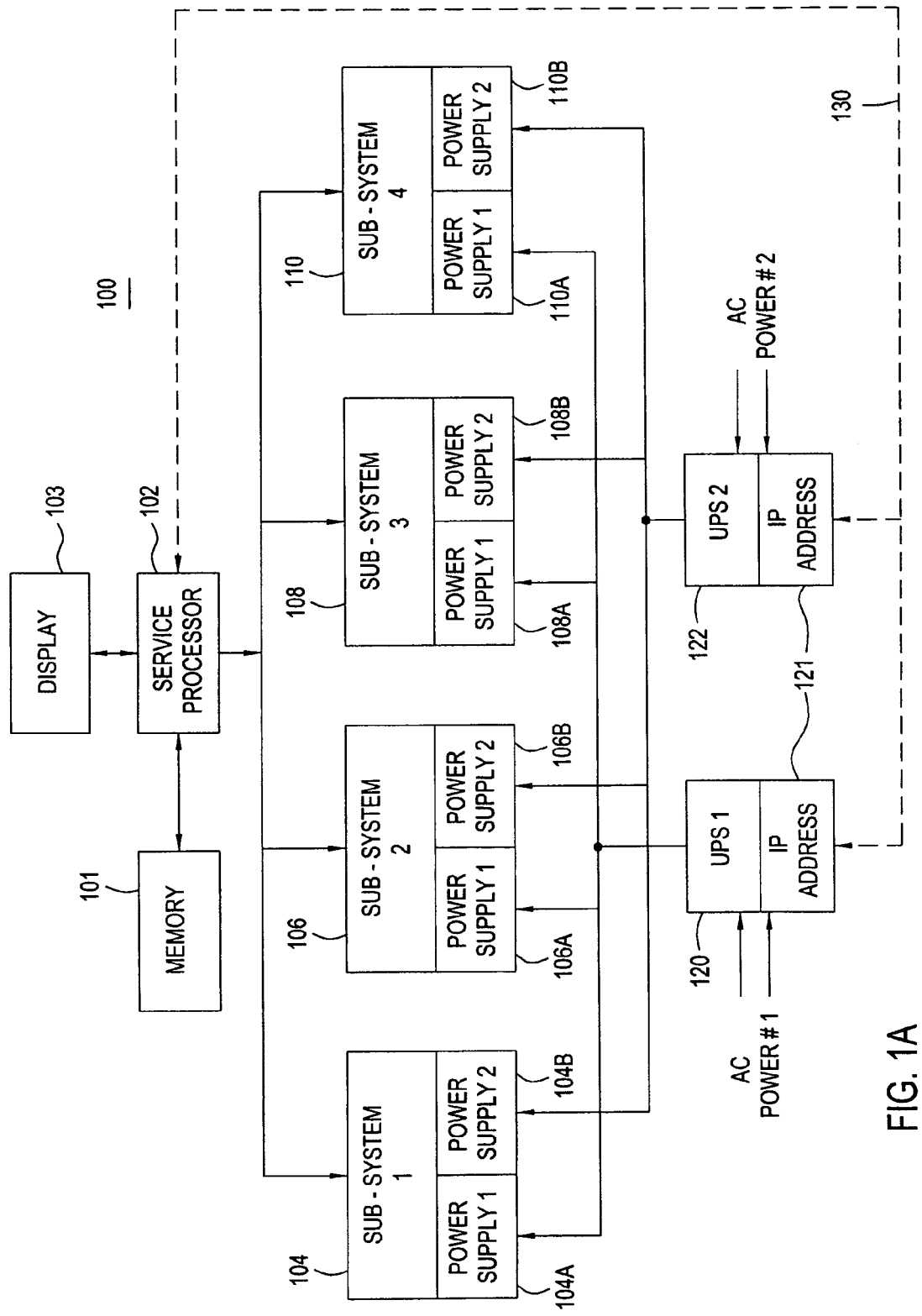
FIG. 1A is a schematic depiction of a high reliability system having sub-systems with redundant power supplies and multiple UPS devices powered from different AC power lines.

FIG. 1A is a schematic depiction of a first embodiment high reliability system 100 that is suitable for practicing the present invention. The system 100 includes numerous sub-systems, each of which includes a redundant power supply. The system 100 includes a service processor 102 that controls and monitors the overall operation of the system 100. The service processor 102 is operated by software that is stored in memory 101 and that implements the overall purpose of the system 100. As the present invention relates to ensuring the integrity of the system power, part of that software, referred to herein as power micro-code, will be specifically discussed.

The system 100 includes a plurality of N (an integer) sub-systems, illustrated by the subsystems 104, 106, 108, and 110, each of which includes two power supplies, labeled 104A-104B through 110A-110B. Each power supply can individually power its associated sub-system, e.g., the power supply 106A can completely power the sub-system 106. Thus, the pairs of power supplies 104A-104B through 110A-110B are redundant in that only one needs to operate.

Figure 1B:
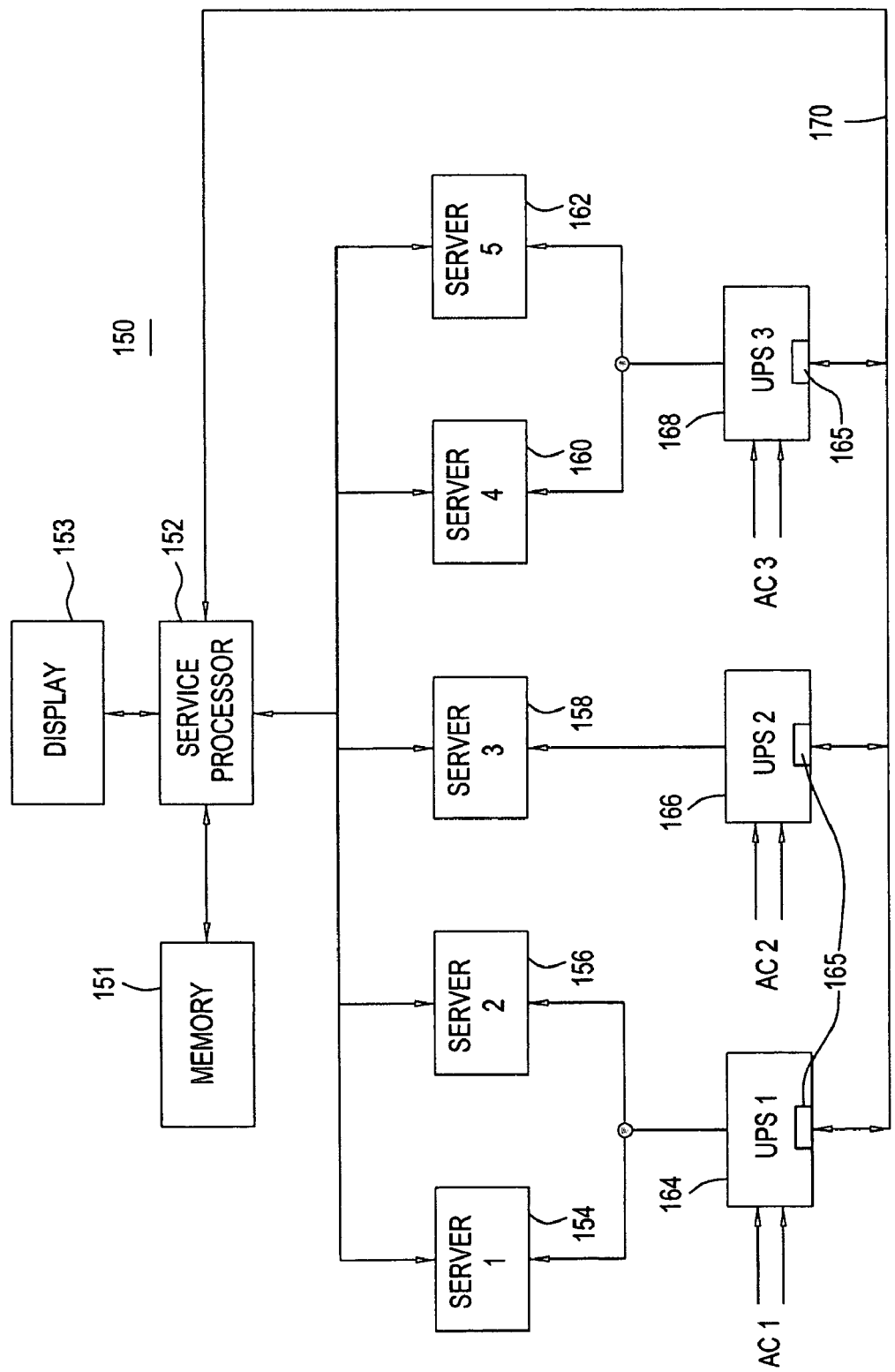
FIG. 1B is a schematic depiction of a high reliability system having distributed sub-systems and multiple UPS devices powered from different AC power lines.

Each power supply is powered by an uninterruptible power supply UPS. As shown, the system 100 has two UPS devices, a UPS 120 and a UPS 122. One power supply of each subsystem is powered by UPS 120 while the other power supply is powered by UPS 122. The UPS 120 receives its power from AC power line #1 while the UPS 122 receives its power from the AC power line #2. Since each power supply is connected to a UPS device, and since each UPS device is connected to an AC power line, each power supply is operatively connected to an AC power line. This is because an AC power line sources operating power even though a UPS device comes between the AC power line and a power supply. While FIG. 1A shows only 2 UPS devices, some systems may have only one UPS device while others may have three or more, possibly many more. Examples of systems with more than two UPS are illustrated in FIG. 1B. Additionally, while FIG. 1A shows only two AC power lines, some systems may use three or more. What is important in FIG. 1A is that the power supplies of a particular sub-system are ultimately powered by different UPS devices. The overall goal is to ensure that a failure of one AC power line does not cause both power supplies of a subsystem to fail (thus preserving their redundant status).

In the system 100 the service processor 102 can send power microcode commands via a bus 130 to each UPS. That microcode code controls the operation of each UPS. Also, each UPS has a discrete IP address or other identifier, such as a serial number, that uniquely identifies the UPS. Each UPS also includes the capability to send that identifier to the service processor 102 along with information related to the capability of that UPS device to perform its tasks, such as its ability to reliably supply power and for how long that power can be supplied. FIG. 1A shows this communication capability being supplied by bus transceivers 121. Additional information also can be sent, such as surge capacity, whether UPS device can decrease/increase output voltage to aid in the determining of AC wiring map and possibly warnings as available power is depleted.

Given the foregoing information, the service processor 102 can determine if each UPS device is suitable for performing its tasks. If a UPS device is unsuitable, a warning can be provided, such as a message on a display 103. Additionally, the service processor 102 can match the UPS device information to the actual tasks being performed. For example, if a UPS device is capable of providing 800 watts for 8 hours, and if the actual load capacity is 600 watts, the service processor 102 can determine how long that UPS device can reliably provide the 600 watt load. Based on that calculation, the service processor can provide for a controlled shut-down of sub-systems within the calculated time.

FIG. 1B is a schematic depiction of a second embodiment high reliability system 150 that is suitable for practicing the present invention. The system 150 includes a plurality of distributed subsystems which are not all connected to the same UPS system or to the AC input line. As shown, the system 150 includes a service processor 152 that controls and monitors the overall operation of the system 150. The service processor 152 is controlled by software that is stored in memory 151 and that implements the overall purpose of the system 150.

The system 150 includes a plurality of N (an integer) sub-systems that are illustrated by the servers (1-5), which are identified as server devices 154, 156, 158, 160, and 162. Each server device handles communications with a plurality of users. The server devices 154, 156, 158, 160, and 162 connect to uninterruptible power supplies UPS1, UPS2, and UPS3, which are identified as UPS devices 164, 166, and 168. The UPS device 164 receives its input power from AC power line #1, UPS device 166 receives its input power from AC power line #2, and UPS device 168 receives its input power from AC power line #3. Since each server is connected to a UPS, and since each UPS is connected to an AC power line, each server is operatively powered by an AC power line.

In the system 150 the service processor 152 can send power microcode commands via bus 170 to each UPS device that controls the operation of each UPS device. Also, each UPS device has a discrete IP address or other identifier, such as a serial number, that uniquely identifies the UPS device. As in the system 100, each UPS includes the capability of sending that identifier to the service processor 152 along with information related to the capability of that UPS device to perform its tasks, such as its ability to reliably supply power and for how long that power can be supplied. In FIG. 1B that communication capability is supplied by bus transceivers 165. As in the system 100, additional factors also can be supplied, such as surge capacity, whether UPS device can decrease/increase output voltage to aid in the determining of AC wiring map, and possibly warnings as available power is depleted (e.g., on a display 153). Given the foregoing information, along with information about the power requirements of the servers 154-162, the service processor 152 can determine if each UPS device is suitable for performing its tasks.

FIGS. 1A and 1B illustrate two useful embodiments of the present invention: systems having sub-systems with redundant power supplies and a distributed system, respectively. However, other systems also will be able to make use of the principles of the present invention. Those principles include automatically determining the capability of UPS devices, which can enable a determination if the UPS devices are suitable for performing their protective tasks. Those principles can also include determining which sub-system is connected to which UPS device, and possibly which UPS device is connected to which AC power line.

Figure 2:
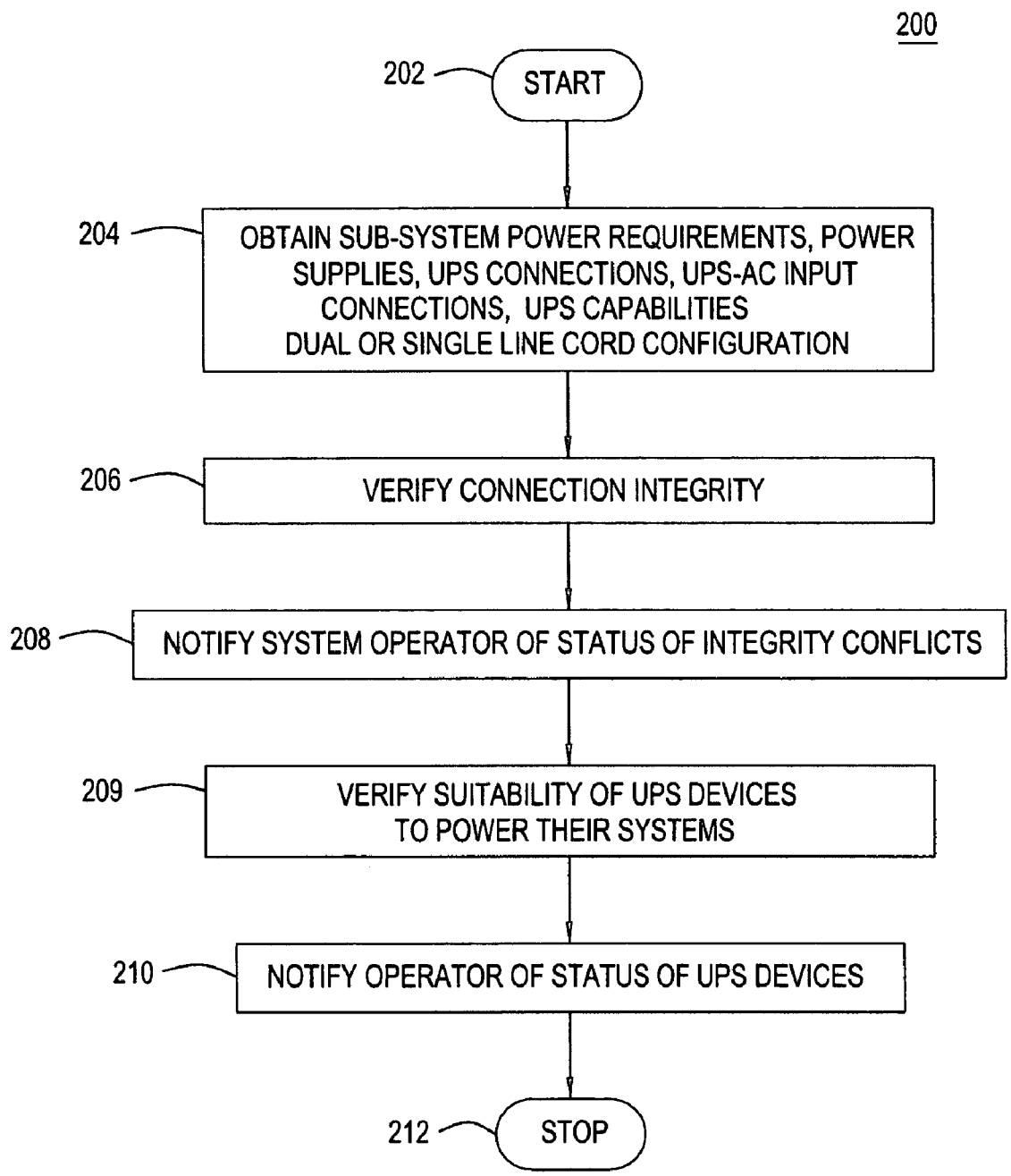
FIG. 2 is a flow diagram of a first process for checking the integrity of the power supplies and the UPS systems and their capabilities.

FIG. 2 illustrates a first process 200 that is in accord with the principles of the present for improving the reliability of systems having UPS devices. As shown in FIG. 2, the process 200 starts at step 202 and proceeds, at step 204, with determining sub-system power requirements, the power supplies of the sub-systems, the UPS connections to the power supplies, the connections of the UPS devices to AC power lines, the capabilities of the UPS devices, and if this is a single or dual line cord configuration. An exemplary data table 300 of such determinations is shown in FIG. 3. The determined information is stored in memory 101 (see FIG. 1A) or in memory 151 (FIG. 1B). After step 204, at step 206 the system verifies connection integrity by ensuring that each sub-system has power supplies that eventually connect to different UPS devices and to different AC power lines, for a dual line cord configuration. At step 208 the system notifies a system operator of the status of the connection integrity. If a connection integrity conflict exists the operator is notified, if not, the operator is notified that connection integrity is intact. Then, at step 209, the system verifies that the UPS devices are capable of performing their intended tasks. This is performed by ensuring that the UPS devices can power their sub-systems for the required period of time. This involves comparing the capacity of each UPS device to its load (here, the sub-systems) and deciding if that UPS can deliver the required load for the required time. A UPS device that can supply 450 watts for 8 hours may only be able to supply 600 watts for two hours. Then, at step 210 the system notifies the operator of the status of the UPS devices. If they are suitable for their tasks the operator is notified, if not, the operator is notified where the problem is. Then, at step 212 the method 200 stops.

Referring now to FIG. 3, the data table 300 shows sub-systems 1 and 2 having power supplies that are driven by different UPS devices (note that FIG. 3 lists four UPS devices), and that the power supplies for sub-systems 1 and 2 connect to different AC lines. However, while sub-system 3 has power supplies driven by different UPS devices, those UPS devices are powered by the same AC line. This represents a fault condition and a warning (illustrated by bracketing) is provided to the system operator.

FIG. 3 also shows that UPS device 1, which is capable of supplying 1175 watts for 8 hours, powers sub-systems 1 and 3, which require a total of 750 watts for 8 hours. Additionally, FIG. 3 shows that UPS device 2, which is also capable of supplying 1175 watts for 8 hours, powers sub-system 1, which requires a total of 350 watts for 8 hours, and that UPS device 4, which is capable of supplying 1500 watts for 24 hours, powers sub-system 2, which requires 450 watts for 8 hours. Thus, the system knows that UPS devices 1, 2, and 4 are capable of performing their tasks. However, UPS device 3, which is capable of supplying 720 watts for 8 hours, powers sub-systems 2 and 3, which together require 850 watts for 8 hours. Thus, by finding the system connections, the capabilities of the UPS devices, and the load being driven, the system automatically determines that UPS device 3 is not capable of performing its intended tasks. Thus, the system issues a warning to the operator that UPS device 3 is not adequate to perform its required tasks. The important of checking the dual line cord mapping can be seen for UPS3, in this case, under normal operation where all AC lines and UPS are good, the power supplies on UPS will only draw 375 watt, under the UPS max rating. But a Power supply or UPS faults will cause the load to reach 750 watts which exceeds the UPS max capacity.

Figure 4:
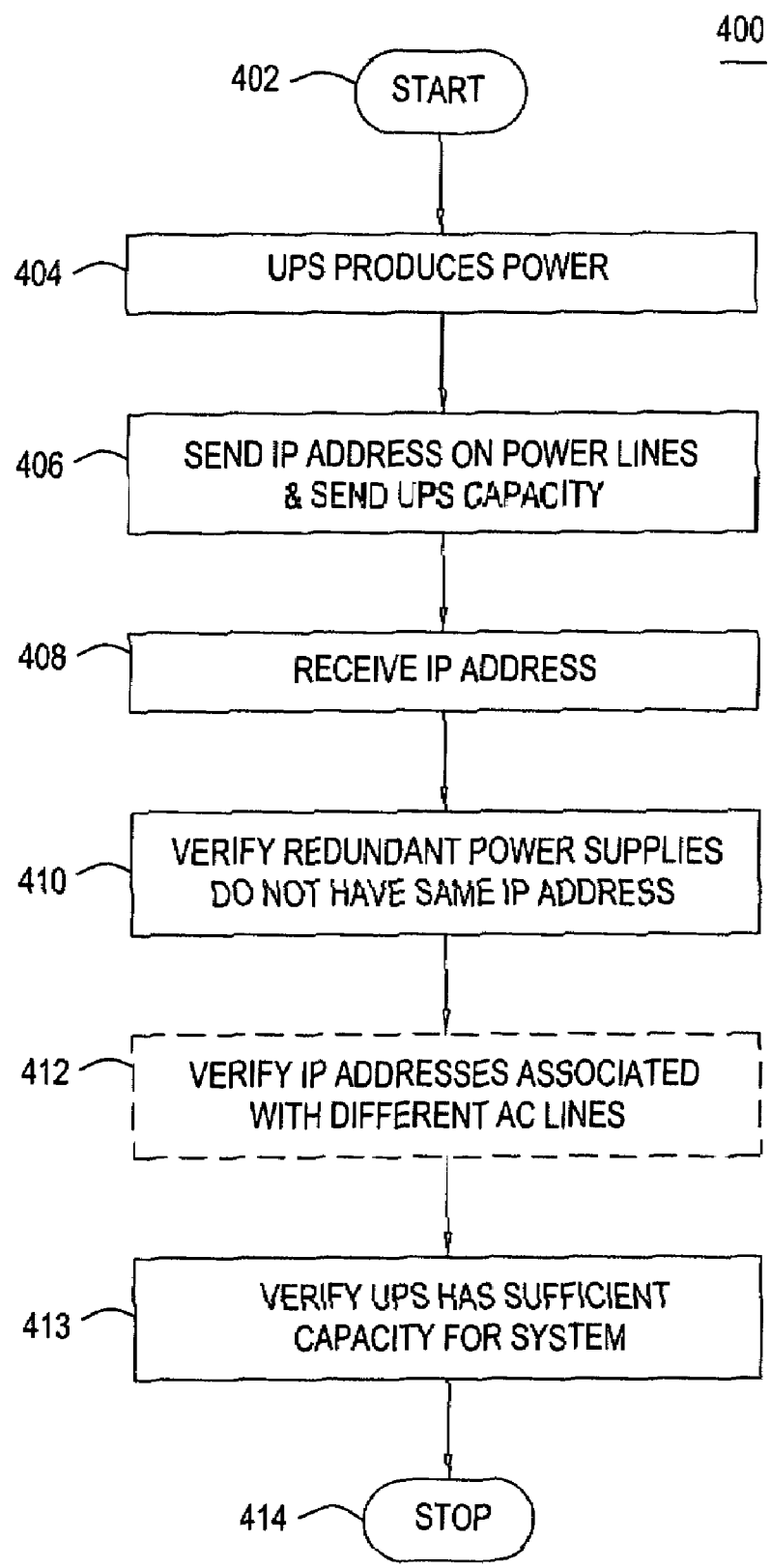
FIG. 4 is a flow diagram of a second process for checking the integrity of the power supplies and the UPS systems, including UPS capacity.

FIG. 4 illustrates another process 400 that is in accord with the principles of the present invention. As shown in FIG. 4, the process 400 starts at step 402 and proceeds, at step 404, by having all of the UPS devices produce power. At step 406, the UPS devices send their individual IP addresses (or other identifier) and their capability on their power lines to the various power supplies (server devices) that they drive. Sending such data can be accomplished using RF modulated signals that are capacitive coupled to the power lines. At step 408, the power supplies/subsystems/service processors receive the IP address by stripping the IP address from the power supply lines. Again, this can be accomplished by capacitive de-coupling of the RF modulated signals from the power lines. Then, at step 410, the individual sub-system or the service processor identifies which UPS connects to which system resource. If appropriate, at optional step 412, verification is made that the IP addresses, and thus the UPS devices are associated with different AC power lines. This requires some prior knowledge about which UPS is connected to which AC power line. This knowledge can be physically entered into the system. At step 413 a determination is made as to whether the UPS devices are capable of performing their tasks. This is accomplished by comparing the UPS device capability against the system requirements. If not, an alarm is set. Finally, at step 414, the method 400 stops.

If a UPS power failure is signaled by a particular UPS device, such as by the UPS sending signals via bus 130 or bus 170, or over the power lines as described with reference to method 400, a service processor, such as service processor 152, can determine from the capability of the UPS how quickly a controlled shut-down of sub-systems or servers powered by the UPS that signaled the failure should occur. Additionally, if more than one UPS device signals a potential failure the service processor could turn off one of the UPS devices and run on the other for a period of time, and then switch to the UPS device that was turned off.

A useful feature of the systems 100 and 150 is the provision for automatic shutdown based on the capability of the UPS devices that power them. While the foregoing has described systems powered by multiple UPS systems, this is not required. A single processor protected by one UPS device can benefit from the principles of the present invention. By automatically determining the capability of the UPS device, a single processor can determine if that UPS device is suitable to protect it, and, if it is, how long that UPS device can reliably provide power.

Figure 5:
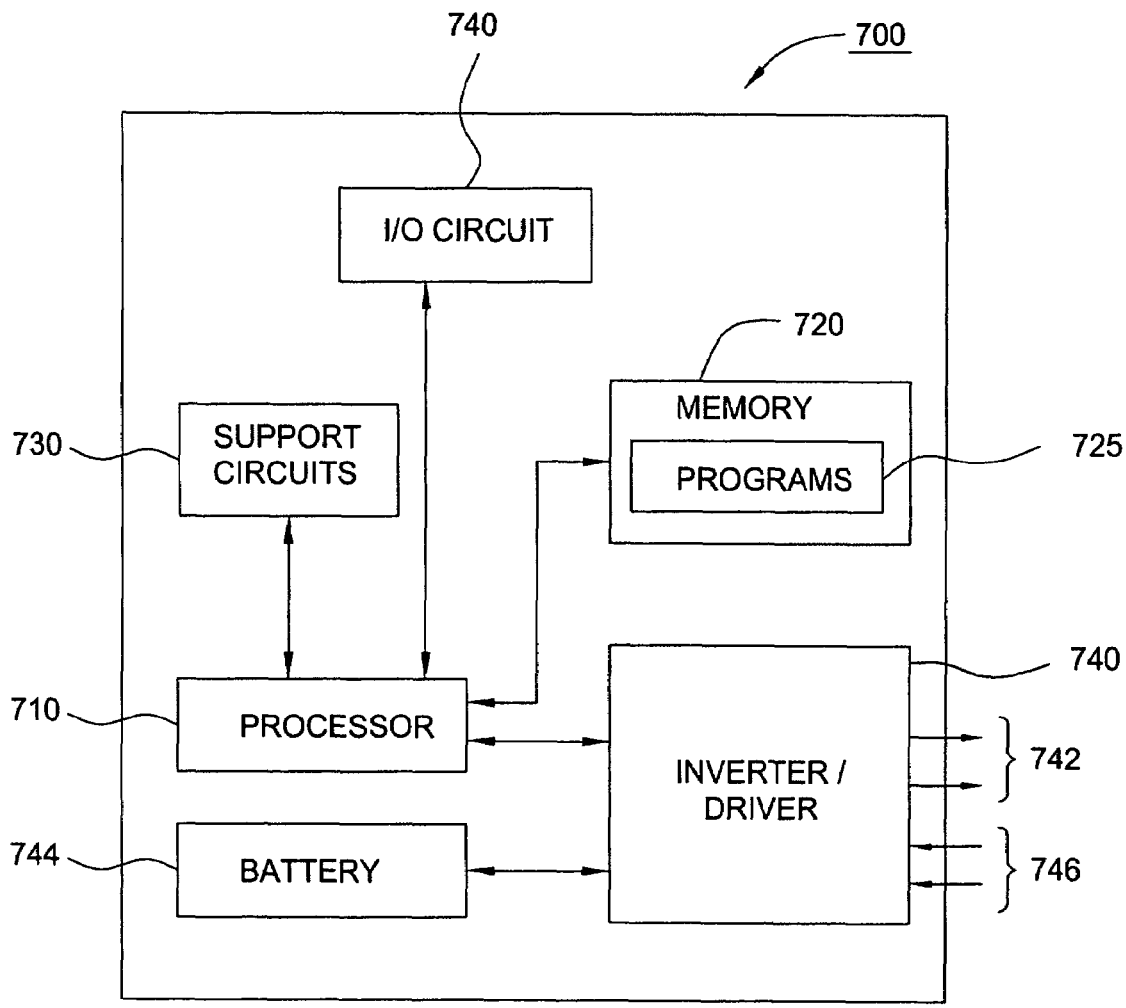
FIG. 5 is a flow diagram of a third process for checking the integrity of the power supplies and of the UPS systems.

FIG. 5 depicts a high level block diagram of an embodiment of a UPS device 700. The UPS device 700 comprises a processor 710 as well as a computer readable media 720 for storing control programs and data structures 725. The processor 710 cooperates with conventional support circuitry 730 such as power supplies, clock circuits, cache memory and the like as well as circuits that assist in executing the software routines stored in the memory 720. As such, it is contemplated that some of the process steps discussed herein as software processes may be implemented within hardware, for example, as circuitry that cooperates with the processor 710 to perform various steps. The UPS device 700 also contains input-output circuitry 740 that forms an interface with the external environment, such as with a service processor 102 or 152.

The UPS device 700 also includes an inverter/driver 740 for supplying output AC power to external devices on output lines 742. That output AC power is derived from a battery 744 that is charged by the inverter/driver 740 using input AC power on input lines 746. The inverter/driver is operated under the control of the processor 710. The processor 710 can cause the inverter/driver to change voltage output or to shut-down. The processor 710 can also send warnings to the external environment using either the I/O circuit 740 of by causing signals to be impressed on the output lines 742. In particular, the processor can send out information regarding the capability of the UPS device 700, which is stored in memory 720. That information can include the available output power, the duration such power is available, information on surge capability and remaining power, and battery charge status. The processor 710 can also signal the existence of a power problem, such as loss of input AC power on input lines 746, or emergency data, such as a power failure is imminent.

Although the UPS device 700 is depicted as having a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

While the foregoing is directed to embodiments of the present invention, other and further embodiments of the invention may be devised without departing from the basic scope thereof, and the scope thereof is determined by the claims that follow.

The invention claimed is:

1. A system, comprising:
    a service processor controlled by operating software;
    an uninterruptible power supply (UPS) for supplying output AC power and for supplying UPS information comprising a UPS identifier and UPS output capability information; and
    a system resource for receiving emergency power from the UPS and UPS information and for sending the UPS information to the service processor;
    wherein the service processor receives and examines the UPS information supplied by the system resource to determine whether the UPS has a required capacity to supply emergency power to the system.

2. The system according to claim 1, wherein the identifying information is an IP address.

3. The system according to claim 1, wherein the identifying information is a serial number.

4. The system according to claim 1, wherein the system resource includes redundant first and second power supplies, and wherein the service processor determines if the first and second power supplies are both connected to the UPS.

5. The system according to claim 4, wherein the service processor initiates a warning if the UPS connects to both the first and second power supplies.

6. The system according to claim 1, wherein the UPS notifies the service processor of an impending power failure, and wherein the service processor performs a controlled shutdown of the system resource in response to the notification.

7. A system, comprising:
a first uninterruptible power supply (UPS) for supplying emergency power on a first power connection and for supplying first UPS information comprising a first UPS identifier and first UPS output capability information;
a second uninterruptible power supply (UPS) for supplying emergency power on a second power connection and for supplying second UPS information comprising a second UPS identifier and second UPS output capability information;
a first system resource operatively connected to the first power connection, the first system resource having predetermined emergency power requirements;
a second system resource operatively connected to the second power connection the second system resource having predetermined emergency power requirements; and
a service processor controlled by operating software having power microcode for:
identifying the first system resource as being connected to the first power and identifies the second system resource as being connected to the second power connection,
receiving the first UPS information and the second UPS information,
determining the emergency power requirements of the first and second system resources, and
determining whether the first UPS can reliably supply emergency power to the first system resource and whether the second UPS can reliably supply emergency power to the second system resource.

8. The system according to claim 7, wherein the power microcode causes an output of the first UPS to increase.

9. The system according to claim 7, wherein the power microcode causes the an output of the first UPS to decrease.

10. The system according to claim 7, wherein the power microcode causes an output of the first UPS to turn off.

11. The system according to claim 7, wherein the power microcode causes the UPS to vary AC power such that the power AC power achieves an out-of-range condition and then achieves an in-range condition.

12. The system according to claim 7, wherein the first system resource includes redundant first and second power supplies, and wherein the service processor initiates a warning if the first and second power supplies are both connected to the first UPS.

13. The system according to claim 7, wherein the first UPS can notify the service processor of an impending power failure.

* * * * *